United States Patent [19]

Sealock, Jr. et al.

[11] Patent Number: 5,100,559

[45] Date of Patent: * Mar. 31, 1992

[54] TREATMENT METHODS FOR BREAKING CERTAIN OIL AND WATER EMULSIONS

[75] Inventors: L. John Sealock, Jr., W. Richland; Eddie G. Baker; Douglas C. Elliott, both of Richland, all of Wash.

[73] Assignee: Battelle Memorial Institute, Richland, Wash.

[*] Notice: The portion of the term of this patent subsequent to Nov. 20, 2007 has been disclaimed.

[21] Appl. No.: 603,462

[22] Filed: Oct. 25, 1990

Related U.S. Application Data

[63] Continuation-in-part of Ser. No. 397,163, Aug. 21, 1989, Pat. No. 4,971,703.

[51] Int. Cl.$^5$ ............................................. B01D 17/04
[52] U.S. Cl. ................................. 210/708; 210/737; 210/774; 210/808; 208/13
[58] Field of Search ............... 210/708, 737, 741, 742, 210/763, 761, 774, 808, 187; 208/13, 187

[56] References Cited

U.S. PATENT DOCUMENTS

| | | | |
|---|---|---|---|
| 2,152,863 | 4/1939 | Bills | 196/5 |
| 2,181,684 | 11/1939 | Walker | 183/2.7 |
| 2,305,464 | 12/1942 | Ashworth | 210/737 |
| 3,576,738 | 4/1971 | Duffy | 210/763 |
| 3,606,731 | 9/1971 | Cole et al. | 55/45 |
| 3,716,464 | 2/1973 | Hess et al. | 208/13 |
| 3,731,801 | 5/1973 | Hess et al. | 210/737 |
| 3,804,756 | 4/1974 | Callahan et al. | 210/763 |
| 3,870,631 | 3/1975 | Fassell et al. | 210/762 |
| 4,014,780 | 3/1977 | McCoy | 208/13 |
| 4,160,742 | 7/1979 | Raman | 252/344 |
| 4,382,852 | 6/1983 | McCoy et al. | 208/188 |
| 4,383,927 | 6/1983 | Srivatsa | 210/708 |
| 4,387,017 | 6/1983 | McEntire et al. | 208/188 |
| 4,525,283 | 6/1985 | Horak et al. | 210/762 |
| 4,594,141 | 6/1986 | Paspek, Jr. et al. | 208/390 |
| 4,708,788 | 11/1987 | Low | 208/390 |
| 4,909,947 | 3/1990 | Johnson et al. | 210/737 |
| 4,971,703 | 11/1990 | Sealock, Jr. et al. | 210/708 |

FOREIGN PATENT DOCUMENTS

258216A1 7/1988 German Democratic Rep.

Primary Examiner—Stanley S. Silverman
Assistant Examiner—Christopher Upton
Attorney, Agent, or Firm—Wells, St. John & Roberts

[57] ABSTRACT

Disclosed are treatment methods for breaking emulsions of petroleum oil and salt water, fatty oil and water, and those resulting from liquefication of organic material. The emulsions are broken by heating to a predetermined temperature at or above about 200° C. and pressurizing to a predetermined pressure above the vapor pressure of water at the predetermined temperature to produce a heated and pressurized fluid. The heated and pressurized fluid is contained in a single vessel at the predetermined temperature and pressure for a predetermined period of time to effectively separate the emulsion into substantially distinct first and second phases, the first phase comprising primarily the petroleum oil, the second phase comprising primarily the water. The first and second phases are separately withdrawn from the vessel at a withdraw temperature between about 200° C. and 374° C. and a withdraw pressure above the vapor pressure of water at the withdraw temperature. Where solids are present in the certain emulsions, the above described treatment may also effectively separate the certain emulsion into a substantially distinct third phase comprising primarily the solids.

50 Claims, No Drawings

TREATMENT METHODS FOR BREAKING CERTAIN OIL AND WATER EMULSIONS

RELATED U.S. PATENT DATA

This patent resulted from an application which was a continuation-in-part of U.S. patent application Ser. No. 07/397,163, filed Aug. 21, 1989, now U.S. Pat. No. 4,971,703.

TECHNICAL FIELD

This invention relates in a first part to a process for treating a salt water-petroleum oil emulsion. In a second part, this invention relates to a process for treating an organic liquefaction product oil and water emulsion. In a third part, this invention relates to a process for treating a water-fatty oil emulsion.

BACKGROUND ART

Certain undesired mixtures of oil and water form distinct emulsions that are very difficult to break into separate oil and water fractions for recovery. One such emulsion category is the petroleum oil and water emulsions derived from producing or processing crude oil of our parent U.S. Pat. No. 4,971,703. One emulsion derived from the production of crude oil results from oil spills in the ocean.

Oil is in constant transit around the globe in a variety of forms. There have always been oil spill problems at sea, and this problem will most likely continue. Smaller magnitude oil spills also occur in harbors, rivers, lakes and streams. Two thirds of all oil spills occur during routine operations as a result of human error.

Recovery of oil spills concerns both the containment and collection of the spill, as well as recovery or disposal of that which is collected. Oil pollution of waterways from the production or processing of crude oil is a complex problem that must take into account the interaction of the oil, water and wind. It has been documented that several forms of oil and water emulsions occur and complicate the cleanup of oil spills. In the ocean, the presence of salt and other contaminants such as sand alter the physical properties of oil and water, making them difficult or impossible to treat with conventional technologies. Furthermore, much of the recovered spilled oil is of marginal or no use because it is too foamed and emulsified to effect adequate separation.

It is acknowledged that a crude oil-water emulsion changes in the aftermath of a spill. In the days immediately following a spill, the lighter fractions tend to vaporize. This results in thickening, leaving emulsions of the heavier fractions and water which are extremely difficult to collect or treat.

Crude oil is the primary source for liquid fuels. However, much research has been conducted in recent years for the development of processes for the production of liquid fuels from other sources. Such processes include, by way of example, the production of synthetic liquid fuel from coal and organic wastes by liquefaction. The separation of the formed liquid fuel from solid by-products can be difficult in part because of solid and liquid contaminants. In our own development of a sludge-to-oil reactor system for producing fuel, liquid fuel is produced by thermal treatment of sewage sludge in the presence of added alkali. Such process is described in *Research in Thermochemical Biomass Conversion*, Elsevier Applied Science, pp. 867-881, a copy of which was provided with the Information Disclosure Statement accompanying the application from which this patent matured. Separation of the liquid fuel from residual water and inorganic components is expected to cause some difficulty using conventional technology.

The problems of dealing with oil and water emulsions is not confined to the petroleum processing industry or to oil contaminated spills. Discharge streams from food processing and other facilities can also contain fatty oil and water emulsions that must be treated.

DISCLOSURE OF INVENTION AND BEST MODES FOR CARRYING OUT THE INVENTION

The following disclosure of the invention is submitted in furtherance with the constitutional purpose of the U.S. Patent Laws "to promote the progress of science and useful arts" (Article 1, Section 8).

Salt Water-Petroleum Oil Emulsions

In accordance with one aspect of the invention, a process for treating a salt water-petroleum oil emulsion comprises:

heating the emulsion to a predetermined temperature at or above about 200° C. and pressurizing the emulsion to a predetermined pressure above the vapor pressure of water at the predetermined temperature to produce a heated and pressurized fluid;

breaking the emulsion by containing the heated and pressurized fluid in a single vessel at the predetermined temperature and pressure for a predetermined period of time to effectively separate the emulsion into substantially distinct first and second phases, the first phase comprising primarily the petroleum oil, the second phase comprising primarily the salt water; and separately withdrawing the first and second phase from the single vessel at a withdraw temperature between about 200° C. and 374° C. and a withdraw pressure above the vapor pressure of water at the withdraw temperature.

A predetermined treatment temperature at or above about 200° C. and below the 374° C. critical point of water is believed to be preferred. At these temperatures, the vapor pressure of water is 225 psia and 3208 psia, respectively. Containment in a single vessel will effect phase separation for withdrawal, although the emulsion may be heated, pressurized or subjected to some other treatment upstream of a single separation containment vessel, as with our parent patent disclosure.

Where solids are present in the salt water-petroleum oil emulsion, containment of the heated and pressurized fluid in a vessel should also effectively separate the emulsion into a substantially distinct third phase comprising primarily solids, with the third phase being beneath the water phase.

The phases are separately withdrawn from the vessel, preferably without any appreciable reduction in temperature and pressure, and at a withdraw temperature of at least about 200° C. and above the vapor pressure of water at the withdraw temperature. It is anticipated that the predetermined treatment temperature and withdraw temperature will be substantially the same, although this may not be a requirement. It is expected that the treatment time at temperature and pressure should be less than or equal to about 60 minutes.

Vessels such as described in our parent U.S. Pat. No. 4,971,703 could be used to effect the above described separations.

Tests were conducted in a one-liter batch reactor to substantiate the invention. The following examples are provided. The oil-salt water emulsions were made by mixing Alaskan Crude Oil or 2-cycle marine oil, as indicated, with equal amounts of a salt water solution. The salt water solution was prepared by adding 84 grams of SEA-SALT (ASTM D1141.52) in 2.0 liters of water to simulate ocean salt water. The 2-cycle marine oil, having been processed, does not contain solids. Accordingly, no solids were visible upon breaking the 2-cycle oil-salt water emulsions.

| Temperature | Mixture | Results |
| --- | --- | --- |
| 350° C. | Marine oil/Saltwater | Complete separation of oil and water into apparent 50/50 split. No remaining emulsion layer. No visible solids. |
| 250° C. | Marine oil/Saltwater | Complete separation of oil and water into apparent 55/45 split, respectively. No remaining emulsion layer. No visible solids. |
| 200° C. | Marine oil/Saltwater | Complete separation of oil and water into apparent 55/45 split, respectively. No remaining emulsion layer. Water had a slight color which may be indicative of trace amounts of oil. A distinct line of oil and water separation was present. No visible solids. |
| 250° C. | Alaskan Crude/Saltwater | Complete separation of oil and water into apparent 50/50 split. No remaining emulsion layer. Visible solids at bottom of water layer of about 1/16 inch. |
| 200° C. | Alaskan Crude/Saltwater | Complete separation of oil and water into apparent 50/50 split. No remaining emulsion layer. Visible solids at bottom of water layer, but in a lesser quantity than 250° C. test. |
| 150° C. | Alaskan Crude/Saltwater | Significantly less separation of oil and water. Presence of a remaining emulsion layer (globules) between oil and water layers. No visible solids at bottom of water layer-no solids separation. Some solids visible at the oil/water interface and in the globules. |
| 100° C. | Alaskan Crude/Saltwater | Some separation of oil and water. Presence of a remaining emulsion layer (globules) between oil and water layers. Emulsion layer significantly larger than 150° C. test. No visible solids at bottom of water layer-no solids separation. Significant solids visible at the oil/water interface and in the globules. |

All tests were conducted at the temperature specified, and the reactor was maintained at or above the vapor pressure of water at the temperature.

The above tests of marine oil and Alaskan Crude mixtures with water are believed to provide representative data for separation conditions that might occur early in the aftermath of a spill. As a spill begins to age, evaporation of the light fractions will tend to leave a heavier oil/salt water mixture that is expected to require temperatures above 200° C. to obtain complete oil/sea water separation, as well as solid separation. If total solid separation from the oil is desired, it is expected that a temperature above 250° C. will be required. As an oil spill emulsion becomes heavier and more difficult to pump the result of light fraction evaporation, or is mixed with sediments or other solids, it is expected that temperatures above 300° C. will be required to obtain adequate oil/salt water/solids separation.

It is postulated that the quantity and type of solids contained in the emulsion will affect the ease of emulsion separation. Also, the heavier and more aromatic the oil contained in the emulsion, the harder the emulsion will be to treat.

Liquefaction Product

In accordance with another aspect of the invention, a process for treating an organic liquefaction product oil and water emulsion comprises:

heating the emulsion to a predetermined temperature at or above about 200° C. and pressurizing the emulsion to a predetermined pressure above the vapor pressure of water at the predetermined temperature to produce a heated and pressurized fluid;

breaking the emulsion by containing the heated and pressurized fluid in a single vessel at the predetermined temperature and pressure for a predetermined period of time to effectively separate the emulsion into substantially distinct first and second phases, the first phase comprising primarily the oil, the second phase comprising primarily the water; and separately withdrawing the first and second phases from the single vessel at a withdraw temperature between about 200° C. and 374° C. and a withdraw pressure above the vapor pressure of water at the withdraw temperature.

A predetermined treatment temperature at or above about 200° C. and below the 374° C. critical point of water is believed to be preferred. Containment in a single vessel will effect phase separation for withdrawal, although the emulsion may be heated, pressurized or subjected to some other treatment upstream of a single separation containment vessel, as with our parent patent disclosure.

With solids being present in the liquefaction product emulsion, containment of the heated and pressurized fluid in a vessel should also effectively separate the emulsion into a substantially distinct third phase comprising primarily solids, with the third phase being beneath the water phase.

The phases are separately withdrawn from the vessel, preferably without any appreciable reduction in temperature and pressure, and at a withdraw temperature of at least about 200° C. and above the vapor pressure of water at the withdraw temperature. It is anticipated that the predetermined treatment temperature and withdraw temperature will be substantially the same, although this may not be a requirement. It is expected that the treatment time at temperature and pressure should be less than or equal to about 60 minutes.

Food Processing Waste Emulsions and Other
Water-Fatty Oil Emulsions

In accordance with another aspect of the invention, a process for treating a water-fatty oil emulsion comprises:

heating the emulsion to a predetermined temperature at or above about 200° C. and pressurizing the emulsion to a predetermined pressure above the vapor pressure of water at the predetermined temperature to produce a heated and pressurized fluid;

breaking the emulsion by containing the heated and pressurized fluid in a single vessel at the predetermined temperature and pressure for a predetermined period of time to effectively separate the emulsion into substantially distinct first and second phases, the first phase comprising primarily the fatty oil, the second phase comprising primarily the water; and separately withdrawing the first and second phases from the single vessel at a withdraw temperature between about 200° C. and 374° C. and a withdraw pressure above the vapor pressure of water at the withdraw temperature.

A predetermined treatment temperature at or above about 200° C. and below the 374° C. critical point of water is believed to be preferred. Containment in a single vessel will effect phase separation for withdrawal, although the emulsion may be heated, pressurized or subjected to some other treatment upstream of a single separation containment vessel, as with our parent patent disclosure.

In accordance with this aspect of the invention, the fatty oil could be in the form of flowable oil or in grease form. If a substantial amount of solids are present in the emulsion, containment of the heated and pressurized fluid in a vessel should also effectively separate the emulsion into a substantially distinct third phase comprising primarily solids, with the third phase being beneath the water phase.

The phases are separately withdrawn from the vessel, preferably without any appreciable reduction in temperature and pressure, and at a withdraw temperature of at least about 200° C. and above the vapor pressure of water at the withdraw temperature. It is anticipated that the predetermined treatment temperature and withdraw temperature will be substantially the same, although this may not be a requirement. It is expected that the treatment time at temperature and pressure should be less than or equal to about 60 minutes.

Tests were conducted in a one-liter batch reactor to substantiate the invention. The following examples are provided. The below chicken wastewater/sludge was obtained from a chicken processing plant in Alabama. The wastewater/sludge had the appearance of wet mud with some chicken parts therein.

| Temperature | Mixture | Results |
|---|---|---|
| 350° C. | Chicken water sludge | Separation of the oil, water, and solids. Water layer was determined to contain some soluble organics, at about 61 g/kg COD. Sample separated into about ⅓ water and ⅔ fats and oils. Solids were present at both the top and bottom of sample. |
| 300° C. | Chicken water sludge | Substantially the same as the 350° C. test. |
| 350° C. | Chicken water sludge and nickel | Formed a black chunky sludge in water with pink floating globs-apparently "fat". Only fair separation of oil/water. Charring of the organic and massive nickel coking. |
| 200° C. | Chicken water sludge | No-to-poor separation. However, the sludge is more fluid than the original feedstock. |

All tests were conducted at the temperature specified, and the reactor was maintained at or above the vapor pressure of water at the temperature. The above indicates that the presence of nickel was of no assistance, and may be detrimental to the desired separation.

The ease of breaking such emulsions will be based on factors such as type and concentration of the fatty oil/grease, and the quantity and type of solids in the emulsion. These in turn are dependent upon the animal being processed, and the processing method. Sludge-type chicken emulsions, such as tested above, are expected to be one of the most difficult waste streams for the invention process to handle. Other fatty oil and water emulsions produced in different kinds of food processing plants can likely be separated into more distinct fractions, especially if they contain small amounts of solid or solids having roughly the same density.

In compliance with the statute, the invention has been described in language more or less specific as to methodical features. It is to be understood, however, that the invention is not limited to the specific features described, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

We claim:

1. A process for treating a salt water-petroleum oil emulsion comprising the following steps:

heating the emulsion to a predetermined temperature at or above about 200° C. and pressurizing the emulsion to a predetermined pressure above the vapor pressure of water at the predetermined temperature to produce a heated and pressurized fluid;

breaking the emulsion by containing the heated and pressurized fluid in a single vessel at the predetermined temperature and pressure for a predetermined period of time to effectively separate the emulsion into substantially distinct first and second phases, the first phase comprising primarily the petroleum oil, the second phase comprising primarily the salt water; and separately withdrawing the first and second phases from the single vessel at a withdraw temperature between about 200° C. and 374° C. and a withdraw pressure above the vapor pressure of water at the withdraw temperature.

2. The process for treating a salt water-petroleum oil emulsion of claim 1 wherein the predetermined temperature is at or above 250° C.

3. The process for treating a salt water-petroleum oil emulsion of claim 1 wherein the predetermined temperature and withdraw temperature are both at or above 250° C.

4. The process for treating a salt water-petroleum oil emulsion of claim 1 wherein the predetermined temperature is at or above 300° C.

5. The process for treating a salt water-petroleum oil emulsion of claim 1 wherein the predetermined temperature and withdraw temperature are both at or above 300° C.

6. The process for treating a salt water-petroleum oil emulsion of claim 1 wherein the predetermined period of time is less than or equal to about sixty minutes.

7. The process for treating a salt water-petroleum oil emulsion of claim 1 wherein the step of containing the heated and pressurized fluid in a single vessel also effectively separates the emulsion into a substantially distinct third phase comprising primarily solids.

8. The process for treating a salt water-petroleum oil emulsion of claim 7 wherein the predetermined temperature is at or above 250° C.

9. The process for treating a salt water-petroleum oil emulsion of claim 7 wherein the predetermined temperature is at or above 300° C., 10. A process for treating a salt water-petroleum oil emulsion comprising the following steps:
heating the emulsion to a predetermined temperature at or above about 200° C. and below the 374° C. critical point of water, and pressurizing the emulsion to a predetermined pressure above the vapor pressure of water at the predetermined temperature to produce a heated and pressurized liquid;
breaking the emulsion by containing the heated and pressurized liquid in a single vessel at the predetermined temperature and pressure for a predetermined period of time to effectively separate the emulsion into substantially distinct first and second phases, the first phase comprising primarily the petroleum oil, the second phase comprising primarily the salt water; and
separately withdrawing the first and second phases from the single vessel at a withdraw temperature between about 200° C. and 374° C. and a withdraw pressure above the vapor pressure of water at the withdraw temperature.

11. The process for treating a salt water-petroleum oil emulsion of claim 10 wherein the predetermined temperature is at or above 250° C. and below the 374° C. critical point of water.

12. The process for treating a salt water-petroleum oil emulsion of claim 10 wherein the predetermined temperature and withdraw temperature are both at or above 250° C. and below the 374° C. critical point of water.

13. The process for treating a salt water-petroleum oil emulsion of claim 10 wherein the predetermined temperature is at or above 300° C. and below the 374° C. critical point of water.

14. The process for treating a salt water-petroleum oil emulsion of claim 10 wherein the predetermined temperature and withdraw temperature are both at or above 300° C. and below the 374° C. critical point of water.

15. The process for treating a salt water-petroleum oil emulsion of claim 10 wherein the predetermined period of time is less than or equal to about sixty minutes.

16. The process for treating a salt water-petroleum oil emulsion of claim 10 wherein the step of containing the heated and pressurized liquid in a single vessel also effectively separates the emulsion into a substantially distinct third phase comprising primarily solids.

17. The process for treating a salt water-petroleum oil emulsion of claim 16 wherein the predetermined temperature is at or above 250° C. and below the 374° C. critical point of water.

18. The process for treating a salt water-petroleum oil emulsion of claim 16 wherein the predetermined temperature is at or above 300° C. and below the 374° C. critical point of water.

19. A process for treating an organic liquefaction product oil and water emulsion comprising the following steps:
heating the emulsion to a predetermined temperature at or above about 200° C. and pressurizing the emulsion to a predetermined pressure above the vapor pressure of water at the predetermined temperature to produce a heated and pressurized fluid;
breaking the emulsion by containing the heated and pressurized fluid in a single vessel at the predetermined temperature and pressure for a predetermined period of time to effectively separate the emulsion into substantially distinct first and second phases, the first phase comprising primarily the oil, the second phase comprising primarily the water; and
separately withdrawing the first and second phases from the single vessel at a withdraw temperature between about 200° C. and 374° C. and a withdraw pressure above the vapor pressure of water at the withdraw temperature.

20. The process for treating an organic liquefaction product oil and water emulsion of claim 19 wherein the predetermined temperature is at or above 250° C.

21. The process for treating an organic liquefaction product oil and water emulsion of claim 19 wherein the predetermined temperature and withdraw temperature are both at or above 250° C.

22. The process for treating an organic liquefaction product oil and water emulsion of claim 19 wherein the predetermined temperature is at or above 300° C.

23. The process for treating an organic liquefaction product oil and water emulsion of claim 19 wherein the predetermined temperature and withdraw temperature are both at or above 300° C.

24. The process for treating an organic liquefaction product oil and water emulsion of claim 19 wherein the predetermined period of time is less than or equal to about sixty minutes.

25. The process for treating an organic liquefaction product oil and water emulsion of claim 19 wherein the step of containing the heated and pressurized fluid in a single vessel also effectively separates the emulsion into a substantially distinct third phase comprising primarily solids.

26. The process for treating an organic liquefaction product oil and water emulsion of claim 25 wherein the predetermined temperature is at or above 250° C.

27. The process for treating an organic liquefaction product oil and water emulsion of claim 25 wherein the predetermined temperature is at or above 300° C.

28. A process for treating an organic liquefaction product oil and water emulsion comprising the following steps:
heating the emulsion to a predetermined temperature at or above about 200° C. and below the 374° C. critical point of water, and pressurizing the emulsion to a predetermined pressure above the vapor pressure of water at the predetermined temperature to produce a heated and pressurized liquid;

breaking the emulsion by containing the heated and pressurized liquid in a single vessel at the predetermined temperature and pressure for a predetermined period of time to effectively separate the emulsion into substantially distinct first and second phases, the first phase comprising primarily the oil, the second phase comprising primarily the water; and separately withdrawing the first and second phases from the single vessel at a withdraw temperature between about 200° C. and 374° C. and a withdraw pressure above the vapor pressure of water at the withdraw temperature.

29. The process for treating an organic liquefaction product oil and water emulsion of claim 28 wherein the predetermined temperature is at or above 250° C. and below the 374° C. critical point of water.

30. The process for treating an organic liquefaction product oil and water emulsion of claim 28 wherein the predetermined temperature and withdraw temperature are both at or above 250° C. and below the 374° C. critical point of water.

31. The process for treating an organic liquefaction product oil and water emulsion of claim 28 wherein the predetermined temperature is at or above 300° C. and below the 374° C. critical point of water.

32. The process for treating an organic liquefaction product oil and water emulsion of claim 28 wherein the predetermined temperature and withdraw temperature are both at or above 300° C. and below the 374° C. critical point of water.

33. The process for treating an organic liquefaction product oil and water emulsion of claim 28 wherein the predetermined period of time is less than or equal to about sixty minutes.

34. The process for treating an organic liquefaction product oil and water emulsion of claim 28 wherein the step of containing the heated and pressurized liquid in a single vessel also effectively separates the emulsion into a substantially distinct third phase comprising primarily solids.

35. The process for treating an organic liquefaction product oil and water emulsion of claim 34 wherein the predetermined temperature is at or above 250° C. and below the 374° C. critical point of water.

36. The process for treating an organic liquefaction product oil and water emulsion of claim 34 wherein the predetermined temperature is at or above 300° C. and below the 374° C. critical point of water.

37. A process for treating a water-fatty oil emulsion comprising the following steps:

heating the emulsion to a predetermined temperature at or above about 200° C. and pressurizing the emulsion to a predetermined pressure above the vapor pressure of water at the predetermined temperature to produce a heated and pressurized fluid;

breaking the emulsion by containing the heated and pressurized fluid in a single vessel at the predetermined temperature and pressure for a predetermined period of time to effectively separate the emulsion into substantially distinct first and second phases, the first phase comprising primarily the fatty oil, the second phase comprising primarily the water; and separately withdrawing the first and second phases from the single vessel at a withdraw temperature between about 200° C. and 374° C. and a withdraw pressure above the vapor pressure of water at the withdraw temperature.

38. The process for treating a water-fatty oil emulsion of claim 37 wherein the predetermined temperature is at or above 250° C.

39. The process for treating a water-fatty oil emulsion of claim 37 wherein the predetermined temperature and withdraw temperature are both at or above 250° C.

40. The process for treating a water-fatty oil emulsion of claim 37 wherein the predetermined temperature is at or above 300° C.

41. The process for treating a water-fatty oil emulsion of claim 37 wherein the predetermined temperature and withdraw temperature are both at or above 300° C.

42. The process for treating a water-fatty oil emulsion of claim 37 wherein the predetermined period of time is less than or equal to about sixty minutes.

43. The process for treating a water-fatty oil emulsion of claim 37 wherein the step of containing the heated and pressurized fluid in a single vessel also effectively separates the emulsion into a substantially distinct third phase comprising primarily solids.

44. A process for treating a water-fatty oil emulsion comprising the following steps:

heating the emulsion to a predetermined temperature at or above about 200° C. and below the 374° C. critical point of water, and pressurizing the emulsion to a predetermined pressure above the vapor pressure of water at the predetermined temperature to produce a heated and pressurized liquid;

breaking the emulsion by containing the heated and pressurized liquid in a single vessel at the predetermined temperature and pressure for a predetermined period of time to effectively separate the emulsion into substantially distinct first and second phases, the first phase comprising primarily the fatty oil, the second phase comprising primarily the water; and separately withdrawing the first and second phases from the single vessel at a withdraw temperature between about 200° C. and 374° and a withdraw pressure above the vapor pressure of water at the withdraw temperature.

45. The process for treating a water-fatty oil emulsion of claim 44 wherein the predetermined temperature is at or above 250° C. and below the 374° C. critical point of water.

46. The process for treating a water-fatty oil emulsion of claim 44 wherein the predetermined temperature and withdraw temperature are both at or above 250° C. and below the 374° C. critical point of water.

47. The process for treating a water-fatty oil emulsion of claim 44 wherein the predetermined temperature is at or above 300° C. and below the 374° C. critical point of water.

48. The process for treating a water-fatty oil emulsion of claim 44 wherein the predetermined temperature and withdraw temperature are both at or above 300° and below the 374° C. critical point of water.

49. The process for treating a water-fatty oil emulsion of claim 44 wherein the predetermined period of time is less than or equal to about sixty minutes.

50. The process for treating a water-fatty oil emulsion of claim 44 wherein the step of containing the heated and pressurized fluid in a single vessel also effectively separates the emulsion into a substantially distinct third phase comprising primarily solids.

* * * * *